(12) United States Patent
Sakai et al.

(10) Patent No.: US 11,633,962 B2
(45) Date of Patent: Apr. 25, 2023

(54) PRINTING DEVICE

(71) Applicant: FUNAI ELECTRIC CO., LTD., Osaka (JP)

(72) Inventors: Hiroki Sakai, Osaka (JP); Yoshihiko Imura, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 22 days.

(21) Appl. No.: 17/222,991

(22) Filed: Apr. 5, 2021

(65) Prior Publication Data

US 2021/0331489 A1 Oct. 28, 2021

(30) Foreign Application Priority Data

Apr. 22, 2020 (JP) .............................. JP2020-076241

(51) Int. Cl.
*B41J 3/407* (2006.01)
*B41J 11/20* (2006.01)

(52) U.S. Cl.
CPC ........... *B41J 3/40731* (2020.08); *B41J 11/20* (2013.01)

(58) Field of Classification Search
CPC .............................. B41J 3/40731; B41J 11/20
See application file for complete search history.

(56) References Cited

U.S. PATENT DOCUMENTS

2020/0298591 A1* 9/2020 Ueno ..................... B41J 11/06
2021/0160390 A1* 5/2021 Sakai ................ H04M 1/72403

FOREIGN PATENT DOCUMENTS

JP 3220536 3/2019

* cited by examiner

*Primary Examiner* — Julian D Huffman
(74) *Attorney, Agent, or Firm* — JCIPRNET

(57) ABSTRACT

Provided is a printing device in which a height position of an object can be accurately adjusted with a simple configuration. The printing device includes: a base part having an opening on a side and multiple first slits and second slits disposed side by side in an up-down direction; a support member for supporting the object, slidably engaged with any first and second slit among the first and second slits in a lateral direction from the opening side and being slidable through the opening between a pull-out position pulled out from the base part and a storage position stored in the base part; and a head part disposed above the support member at the storage position and ejecting ink toward the object supported by the support member.

5 Claims, 12 Drawing Sheets

PRINTING DEVICE

CROSS-REFERENCE TO RELATED APPLICATION

This application claims the priority benefit of Japan application serial no. 2020-076241, filed on Apr. 22, 2020. The entirety of the above-mentioned patent application is hereby incorporated by reference herein and made a part of this specification.

BACKGROUND

Technical Field

The disclosure relates to a printing device for printing on an object.

Description of Related Art

A printing device for printing on an object by an inkjet method is known (see, for example, Patent Document 1). This type of printing device includes a mounting table for placing an object, a head part for ejecting ink toward the object mounted on the mounting table, and an elevating mechanism for raising or lowering the mounting table with respect to the head part.

A user manually rotates a handle provided on the elevating mechanism to raise or lower the mounting table to adjust the height position of the object so that the distance from a printed surface of the object to the head part becomes the optimal distance.

RELATED ART

Patent Document

[Patent Document 1] Japanese Utility Model Registration No. 3220536

However, in the conventional printing device described above, there arises a problem that the configuration of the elevating mechanism becomes large.

The disclosure intends to solve the above-mentioned problem, and the disclosure provides a printing device capable of accurately adjusting the height position of the object with a simple configuration.

SUMMARY

To achieve the above, a printing device according to an aspect of the disclosure is a printing device for printing on an object and includes: a base part which has an opening on a side and has a plurality of engaging parts disposed side by side in an up-down direction; a support member for supporting the object, the support member being slidably engaged with any engaging part among the plurality of engaging parts in a lateral direction from the side of the opening and being slidable through the opening between a pull-out position pulled out from the base part and a storage position stored in the base part; and a head part which is disposed above the support member located at the storage position and ejects ink toward the object supported by the support member.

According to this aspect, the support member is slidably engaged with any engaging part among the plurality of engaging parts in the lateral direction. As a result, since the user only has to engage the support member with the engaging part corresponding to the thickness of the object among the plurality of engaging parts, the height position of the object can be accurately adjusted with a simple configuration.

For example, in a printing device according to an aspect of the disclosure, it may be configured that the base part includes: a first wall which has a first side surface, and a second wall which has a second side surface disposed facing the first side surface; that a space for communicating with the opening and for disposing the support member at the storage position is formed between the first wall and the second wall; and that the plurality of engaging parts include: a plurality of first slits formed on the first side surface of the first wall, each of the plurality of first slits extending in the lateral direction and being disposed side by side in the up-down direction, and a plurality of second slits formed on the second side surface of the second wall, each of the plurality of second slits extending in the lateral direction and being disposed facing each of the plurality of first slits.

According to this aspect, the support member is able to be stably engaged with each of the first slit and the second slit.

For example, in a printing device according to an aspect of the disclosure, it may be configured that a first scale indicating positions of each of the plurality of first slits is provided on the first wall, and that a second scale indicating positions of each of the plurality of second slits is provided on the second wall.

According to this aspect, the user is able to accurately engage the support member with each of the first slit and the second slit at the same height position while visually checking the first scale and the second scale.

For example, in a printing device according to an aspect of the disclosure, it may be configured that the first scale is provided on the first side surface of the first wall, and that the second scale is provided on the second side surface of the second wall.

According to this aspect, it is possible to improve the visibility of the first scale and the second scale when the base part is viewed from the side.

For example, in a printing device according to an aspect of the disclosure, it may be configured that ends of each of the plurality of first slits on the side of the opening are disposed in a stepwise manner along the up-down direction; that the first scale is provided at the ends of each of the plurality of first slits; that ends of each of the plurality of second slits on the side of the opening are disposed in a stepwise manner along the up-down direction; and that the second scale is provided at the ends of each of the plurality of second slits.

According to this aspect, it is possible to improve the visibility of the first scale and the second scale when the base part is viewed from above.

For example, in a printing device according to an aspect of the disclosure, it may be configured that the base part further includes a third wall which has a third side surface disposed on an opposite side of the opening with respect to the space; that the support member, by sliding from the pull-out position toward the storage position, is able to sandwich the object with the third side surface of the third wall in a thickness direction of the object; that a third scale corresponding to the first scale is provided on an upper surface of the first wall; and that a mark for pointing to a part of the third scale corresponding to the thickness of the object when the object is sandwiched between the support member and the third side surface of the third wall is provided on an upper surface of the support member.

According to this aspect, the mark of the support member points to a part of the third scale corresponding to the thickness of the object when the object is sandwiched between the support member and the third side surface of the third wall. As a result, the user only needs to engage the support member with the first slit and the second slit respectively corresponding to a part of the first scale and a part of the second scale, which correspond to a part of the third scale pointed to by the mark of the support member, and the height position of the object is able be easily adjusted.

DESCRIPTION OF THE EMBODIMENTS

According to a printing device according to an aspect of the disclosure, the height position of the object can be accurately adjusted with a simple configuration.

Hereinafter, embodiments of the disclosure will be described in detail with reference to the drawings. Further, all of the embodiments described below are comprehensive or specific examples. Numerical values, shapes, materials, components, disposition positions and connection forms of components and the like shown in the following embodiments are examples, and are not intended to limit the disclosure. Further, among the components in the following embodiments, the components not described in the independent claim(s) will be described as arbitrary components.

First Embodiment

[1-1. Overall Configuration of Printing Device]

Figure 1:
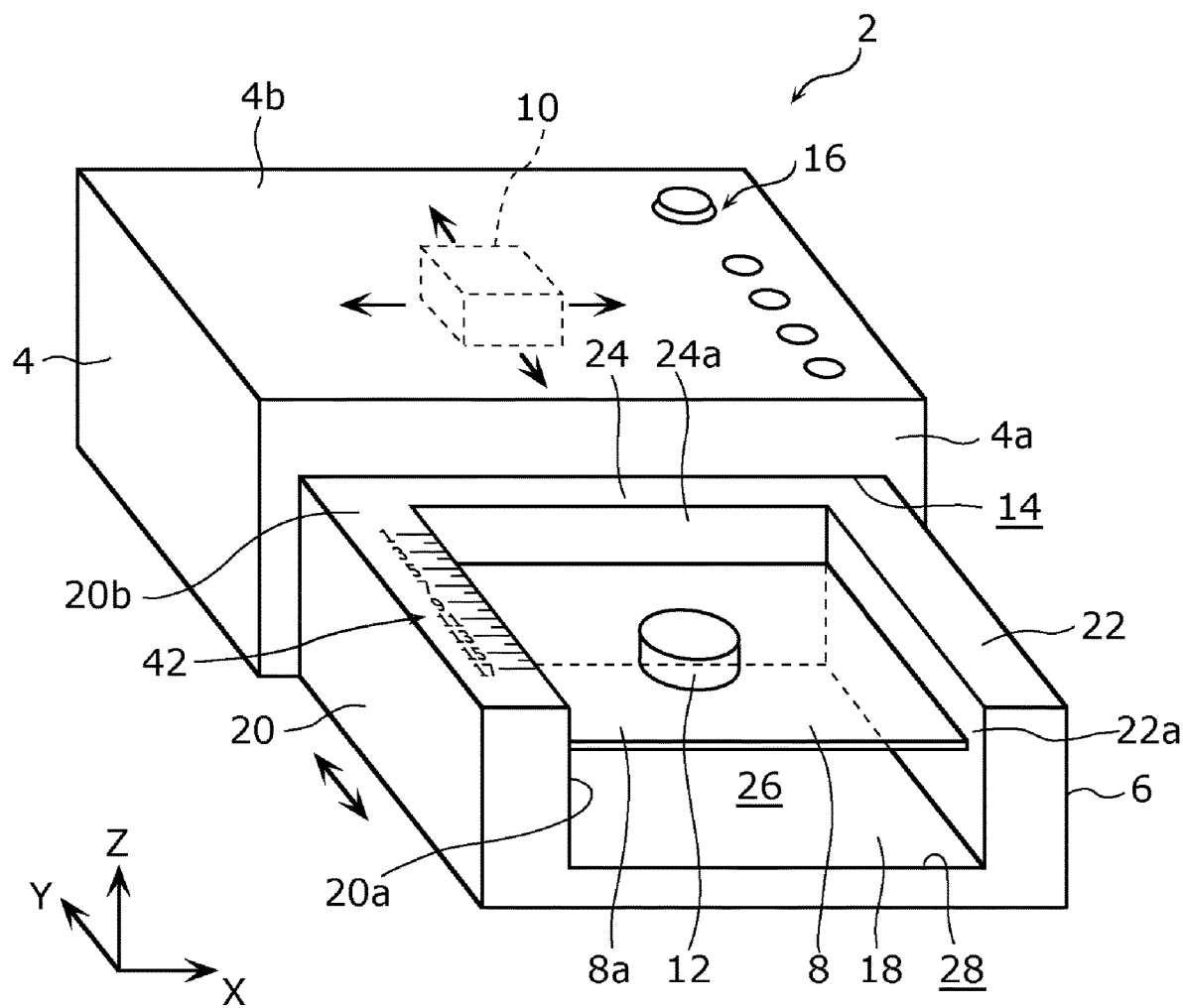
FIG. 1 is a perspective view showing the appearance of the printing device according to the first embodiment.

First, the overall configuration of a printing device 2 according to the first embodiment will be described with reference to FIG. 1. FIG. 1 is a perspective view showing the appearance of the printing device 2 according to the first embodiment. Further, in FIG. 1, the width direction (the left-right direction) of the printing device 2 will be described as the X-axis direction; the depth direction (the front-rear direction) of the printing device 2 will be described as the Y-axis direction; and the height direction (the up-down direction) of the printing device 2 will be described the Z-axis direction.

As shown in FIG. 1, the printing device 2 includes a housing 4, a base part 6, a support member 8, and a head part 10. In the embodiment, the printing device 2 is a what is called food printer for printing a design on an object 12 which is food. In addition, the object 12 is food having various thicknesses, such as a cookie or bread. Further, the design is a concept including, for example, a shape, a pattern, a figure, a color, and the like.

The housing 4 is formed in a box shape, for example. A rectangular opening 14 for inserting the base part 6 is formed in a front surface 4a of the housing 4. A switch unit 16 for operating the printing device 2 is disposed on a top surface 4b of the housing 4.

The base part 6 is a tray base for slidably supporting the support member 8 in the front-rear direction (the Y-axis direction) (an example of the lateral direction) from the side of an opening 28 (to be described later). The base part 6 is disposed inside the housing 4, and as shown in FIG. 1, is able to be pulled out to the outside of the housing 4 on the front side (minus side of the Y axis) through the opening 14 of the housing 4. The configuration of the base part 6 will be described in detail later.

The support member 8 is an insert plate on which the object 12 is placed, and is formed in a rectangular thin plate shape. The thickness of the support member 8 is, for example, about 1 mm to 2 mm. The support member 8 is supported by the base part 6 and is slidable in the front-rear direction with respect to the base part 6 as described later.

The head part 10 is disposed inside the housing 4 above the support member 8 (the plus side of the Z axis) located at a storage position (to be described later). The head part 10 prints on the object 12 placed on an upper surface 8a of the support member 8. The printing method of the head part 10 is an inkjet method in which printing is performed by spraying mist-like ink onto the object 12.

Although not shown, the head part 10 has an ink tank and a print head. The ink tank is filled with, for example, four types of edible inks including CMYK (C: cyan, M: magenta, Y: yellow, K: black). The print head ejects ink of each color from the ink tank downward (the minus side of the Z axis).

When printing is performed, the head part 10 moves from one side to the other side in the front-rear direction (for example, from the plus side to the minus side of the Y axis) while moving reciprocally in the left-right direction (the X-axis direction) by a drive mechanism (not shown). In this state, the ink is sprayed from the print head of the head part 10 toward the object 12 placed on the upper surface 8a of the support member 8, whereby printing is performed on the object 12.

[1-2. Configuration of Base Part]

Figure 2:
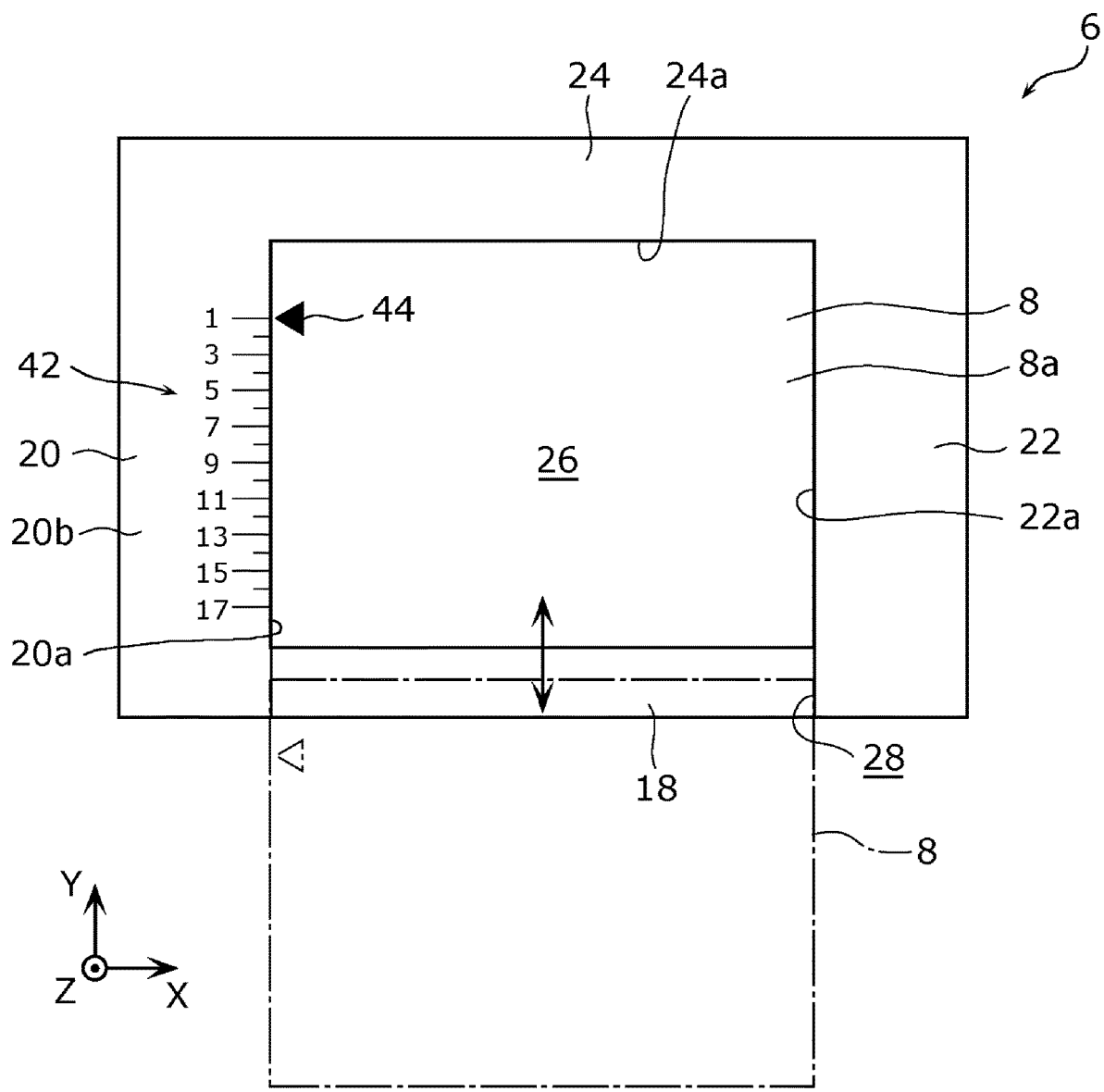
FIG. 2 is a top view showing the base part according to the first embodiment.
Figure 3:
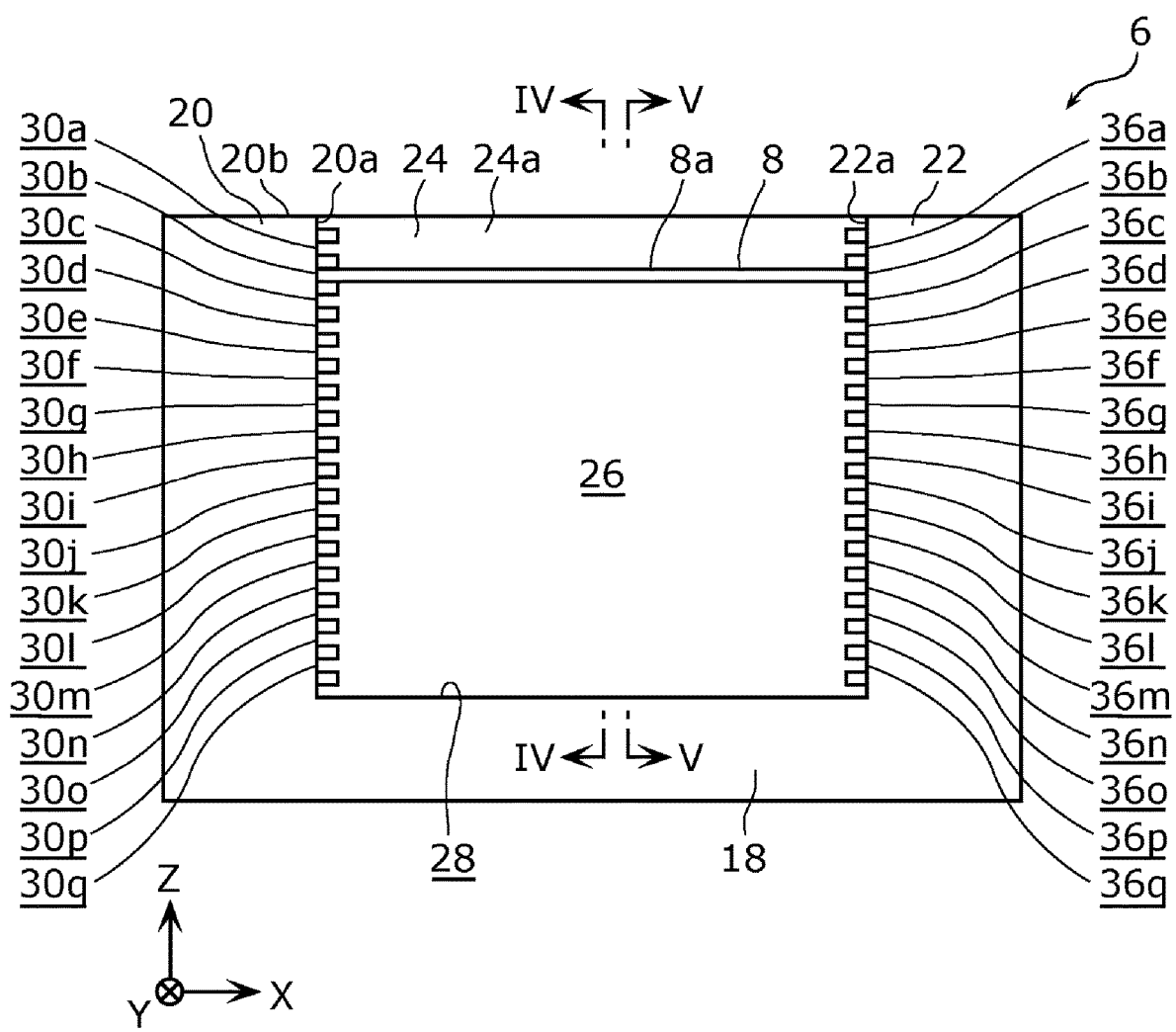
FIG. 3 is a front view showing the base part according to the first embodiment.
Figure 4:
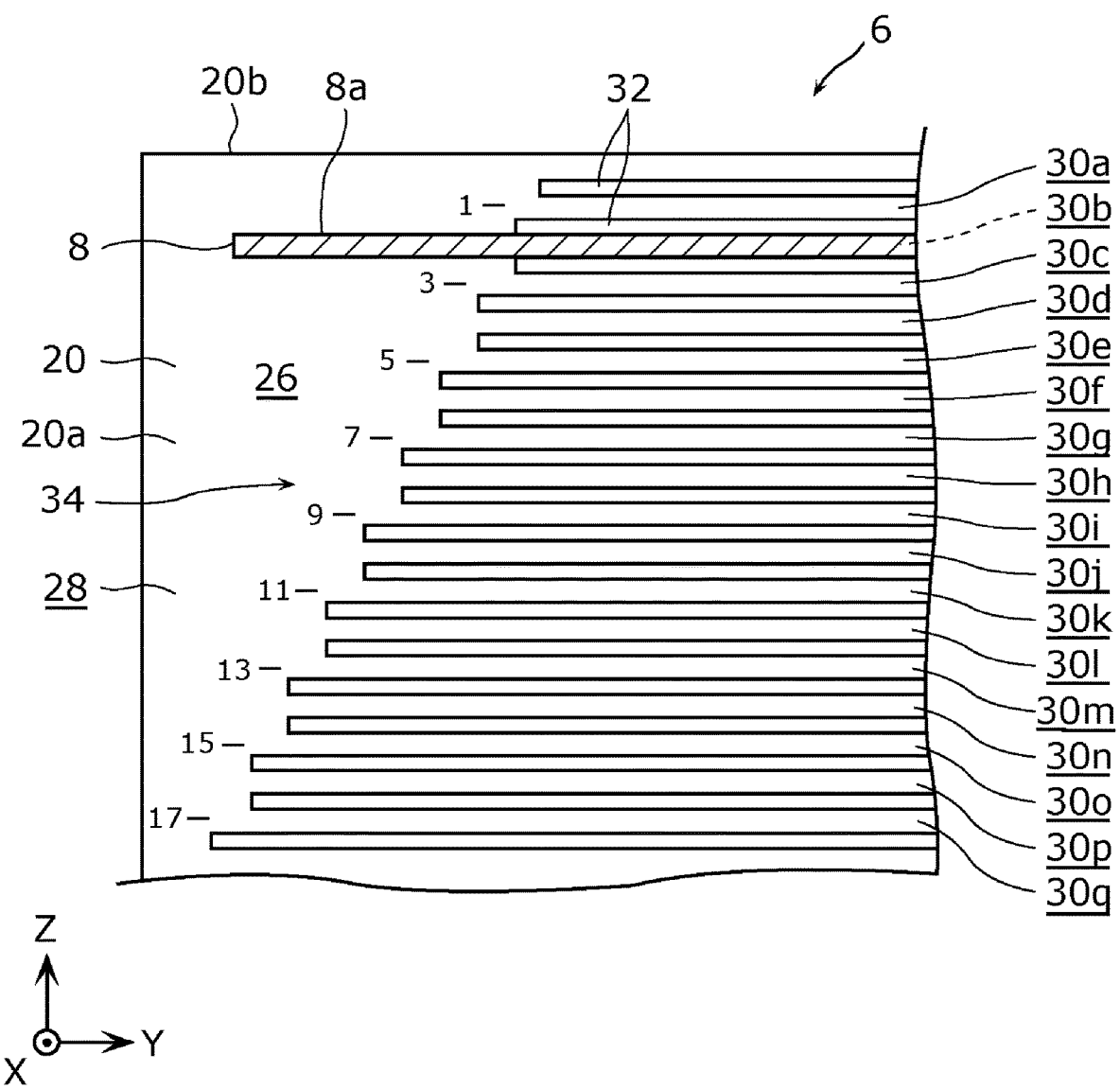
FIG. 4 is a cross-sectional view of a main part taken along the IV-IV line of FIG. 3.
Figure 5:
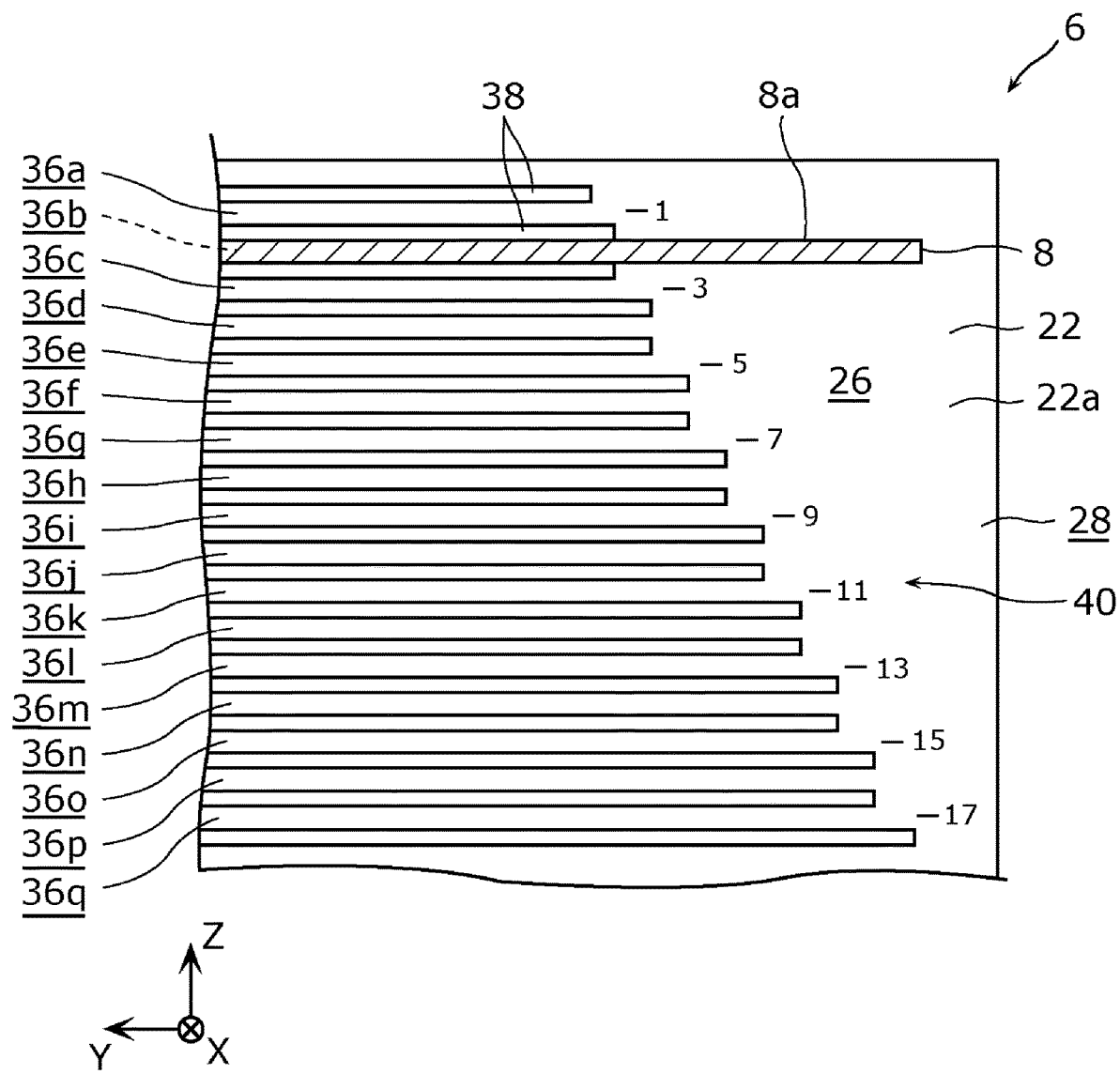
FIG. 5 is a cross-sectional view of a main part taken along the V-V line of FIG. 3.

Next, the configuration of the base part 6 will be described in detail with reference to FIGS. 1 to 5. FIG. 2 is a top view showing the base part 6 according to the first embodiment. FIG. 3 is a front view showing the base part 6 according to the first embodiment. FIG. 4 is a cross-sectional view of a main part taken along the IV-IV line of FIG. 3. FIG. 5 is a cross-sectional view of a main part taken along the V-V line of FIG. 3.

As shown in FIGS. 1 to 3, the base part 6 has a foundation part 18, a first wall 20, a second wall 22, and a third wall 24.

The foundation part 18 is formed in the shape of a rectangular plate. As shown in FIGS. 1 and 2, the first wall 20, the second wall 22 and the third wall 24 are disposed to stand upward from an outer periphery of the foundation part 18 in a U-shape (a substantially U-shape) in the top view (the XY plane view).

In a region surrounded by the first wall 20, the second wall 22 and the third wall 24 (that is, the region between the first wall 20 and the second wall 22), a space 26 for disposing the support member 8 at the storage position is formed. An opening 28 that communicates with the space 26 is formed on the front side of the base part 6.

The first wall 20 is disposed to stand upward from one end (the end on the minus side of the X axis) of the foundation part 18 in the left-right direction. A first side surface 20a is formed on a surface of the first wall 20 on the side of the space 26.

The second wall 22 is disposed to stand upward from the other end (the end on the plus side of the X axis) of the foundation part 18 in the left-right direction. A second side surface 22a is formed on a surface of the second wall 22 on the side of the space 26. The first side surface 20a of the first wall 20 and the second side surface 22a of the second wall 22 are disposed to face each other.

The third wall 24 is disposed to stand upward from one end (the end on the plus side of the Y axis) of the foundation part 18 in the front-rear direction. A third side surface 24a is formed on a surface of the third wall 24 on the side of the space 26. The third side surface 24a of the third wall 24 is disposed on an opposite side of the opening 28 of the base part 6 with respect to the space 26.

As shown in FIGS. 3 and 4, a plurality of first slits 30a to 30q (an example of a plurality of engaging parts) are formed on the first side surface 20a of the first wall 20. In the embodiment, for example, a total of 17 first slits 30a to 30q (30a, 30b, 30c, 30d, 30e, 30f, 30g, 30h, 30i, 30j, 30k, 30l, 30m, 30n, 30o, 30p and 30q) are formed in this order from the top on the first side surface 20a of the first wall 20. Each of the plurality of first slits 30a to 30q extends linearly in the front-rear direction and is disposed side by side in the up-down direction (the Z-axis direction). Further, each of the plurality of first slits 30a to 30q is formed by a pair of elongated ridges 32 protruding from the first side surface 20a of the first wall 20. The pair of ridges 32 extend linearly in the front-rear direction and are disposed at intervals in the up-down direction. As shown in FIG. 4, ends of each of the plurality of first slits 30a to 30q on the side of the opening 28 are disposed in a stepwise manner along the up-down direction.

Further, as shown in FIG. 4, a first scale 34 indicating the positions of each of the plurality of first slits 30a to 30q is provided on the first side surface 20a of the first wall 20. Further, the first scale 34 is provided on the first side surface 20a of the first wall 20 by, for example, engraving, printing, attaching a sticker or the like. On the first scale 34, for example, odd numbers from "1" to "17" are displayed at equal intervals in order from the top. The number "1" of the first scale 34 is provided in the vicinity of the first slit 30a on the top, and the number "17" is provided in the vicinity of the first slit 30q on the bottom.

In this way, serial numbers from "1" to "17" are respectively assigned to the plurality of first slits 30a to 30q in order from the top. For example, the first slit 30a on the top is assigned the number "1"; the first slit 30b being second from the top is assigned the number "2"; the first slit 30c being third from the top is assigned the number "3"; and the first slit 30d being fourth from the top is assigned the number "4." Similarly, for example, the first slit 30n being fourth from the bottom is assigned the number "14"; the first slit 30o being third from the bottom is assigned the number "15"; the first slit 30p being second from the bottom is assigned the number "16"; and the first slit 30q on the bottom is assigned the number "17." Further, in the embodiment, a total of 17 first slits 30a to 30q are formed on the first side surface 20a of the first wall 20, but the number of the first slits is not limited thereto and may be set as appropriate.

As shown in FIGS. 3 and 5, a plurality of second slits 36a to 36q (an example of a plurality of engaging parts) are formed on the second side surface 22a of the second wall 22. In the embodiment, for example, a total of 17 second slits 36a to 36q (36a, 36b, 36c, 36d, 36e, 36f, 36g, 36h, 36i, 36j, 36k, 36l, 36m, 36n, 36o, 36p and 36q) are formed in this order from the top on the second side surface 22a of the second wall 22. Each of the plurality of second slits 36a to 36q extends linearly in the front-rear direction and is disposed side by side in the up-down direction (the Z-axis direction). As shown in FIG. 3, the plurality of second slits 36a to 36q are disposed to face the plurality of first slits 30a to 30q, respectively. Further, each of the plurality of second slits 36a to 36q is formed by a pair of elongated ridges 38 protruding from the second side surface 22a of the second wall 22. The pair of ridges 38 extend linearly in the front-rear direction and are disposed at intervals in the up-down direction. As shown in FIG. 5, the ends of each of the plurality of second slits 36a to 36q on the side of the opening 28 are disposed in a stepwise manner along the up-down direction. In addition, for convenience of description, the plurality of second slits 36a to 36q are not shown in FIG. 1.

Further, as shown in FIG. 5, a second scale 40 indicating the positions of each of the plurality of second slits 36a to 36q is provided on the second side surface 22a of the second wall 22. Further, the second scale 40 is provided on the second side surface 22a of the second wall 22 by, for example, engraving, printing, attaching a sticker or the like. On the second scale 40, for example, odd numbers from "1" to "17" are displayed at equal intervals in order from the top. The number "1" of the second scale 40 is provided in the vicinity of the second slit 36a on the top, and the number "17" is provided in the vicinity of the second slit 36q on the bottom.

In this way, serial numbers from "1" to "17" are respectively assigned to the plurality of second slits 36a to 36q in order from the top. For example, the second slit 36a on the top is assigned the number "1"; the second slit 36b being second from the top is assigned the number "2"; the second slit 36c being third from the top is assigned the number "3"; and the second slit 36d being fourth from the top is assigned the number "4." Similarly, for example, the second slit 36n being fourth from the bottom is assigned the number "14"; the second slit 36o being third from the bottom is assigned the number "15"; the second slit 36p being second from the bottom is assigned the number "16"; and the second slit 36q on the bottom is assigned the number "17." Further, in the embodiment, a total of 17 second slits 36a to 36q are formed on the second side surface 22a of the second wall 22, but the number of the second slits is not limited thereto and may be set as appropriate.

Further, as shown in FIGS. 1 and 2, a third scale 42 corresponding to the first scale 34 is provided on an upper surface 20b of the first wall 20. On the third scale 42, for example, a total of 17 scale lines engraved at equal intervals along the front-rear direction are displayed, and odd numbers from "1" to "17" are displayed at equal intervals from the rear side to the front side (that is, from the side of the third wall 24 toward the side of the opening 28). In this way, a total of 17 scale lines of the third scale 42 are assigned serial numbers from "1" to "17" in order from the rear side to the front side. In addition, the disposition interval of each odd number from "1" to "17" on the third scale 42 is substantially the equal to the disposition interval of each odd number from "1" to "17" on the first scale 34. That is, the disposition interval of the 17 scale lines of the third scale 42 is substantially equal to the disposition interval of the plurality of first slits 30a to 30q.

As shown in FIGS. 3 to 5, one end of the support member 8 in the left-right direction (the end on the minus side of the X axis) is slidably engaged in the front-rear direction with any first slit among the plurality of first slits 30a to 30q, and the other end of the support member 8 in the left-right direction (the end on the plus side of the X axis) is slidably engaged in the front-rear direction with a second slit facing the corresponding any first slit among the plurality of second slits 36a to 36q. In the example shown in FIGS. 3 to 5, the support member 8 is slidably engaged with each of the first slit 30b and the second slit 36b in the front-rear direction. As a result, as shown in FIG. 2, the support member 8 is slidable in the front-rear direction through the opening 28 of the base part 6 between the storage position stored in the base part 6 (the position indicated by the solid line in FIG. 2) and the pull-out position pulled out from the base part 6 (the position indicated by the one-dot chain line in FIG. 2).

Further, as shown in FIG. 2, a mark 44 for pointing to any of the 17 scale lines of the third scale 42 is provided at an end (the end on the minus side of the X axis) of the upper surface 8a of the support member 8 on the side of the first wall 20. The mark 44 is configured by a figure such as a triangle. Further, the mark 44 is provided on the upper surface 8a of the support member 8 by, for example, engraving, printing, attaching a sticker or the like.

[1-3. Use Method of Printing Device]

Figure 6:
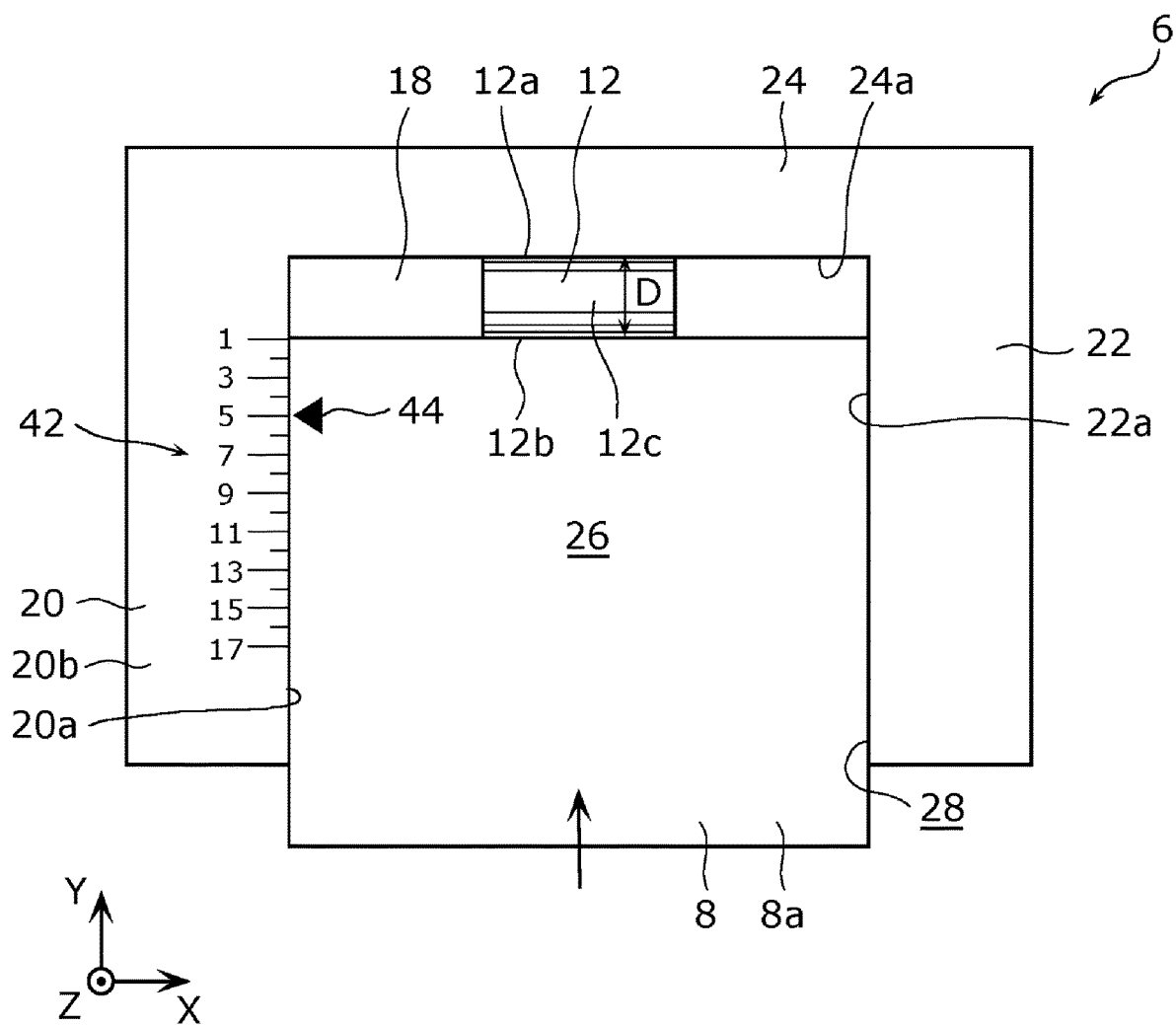
FIG. 6 is a top view showing the base part according to the first embodiment in a state where the object is sandwiched between the support member and the third wall.
Figure 7:
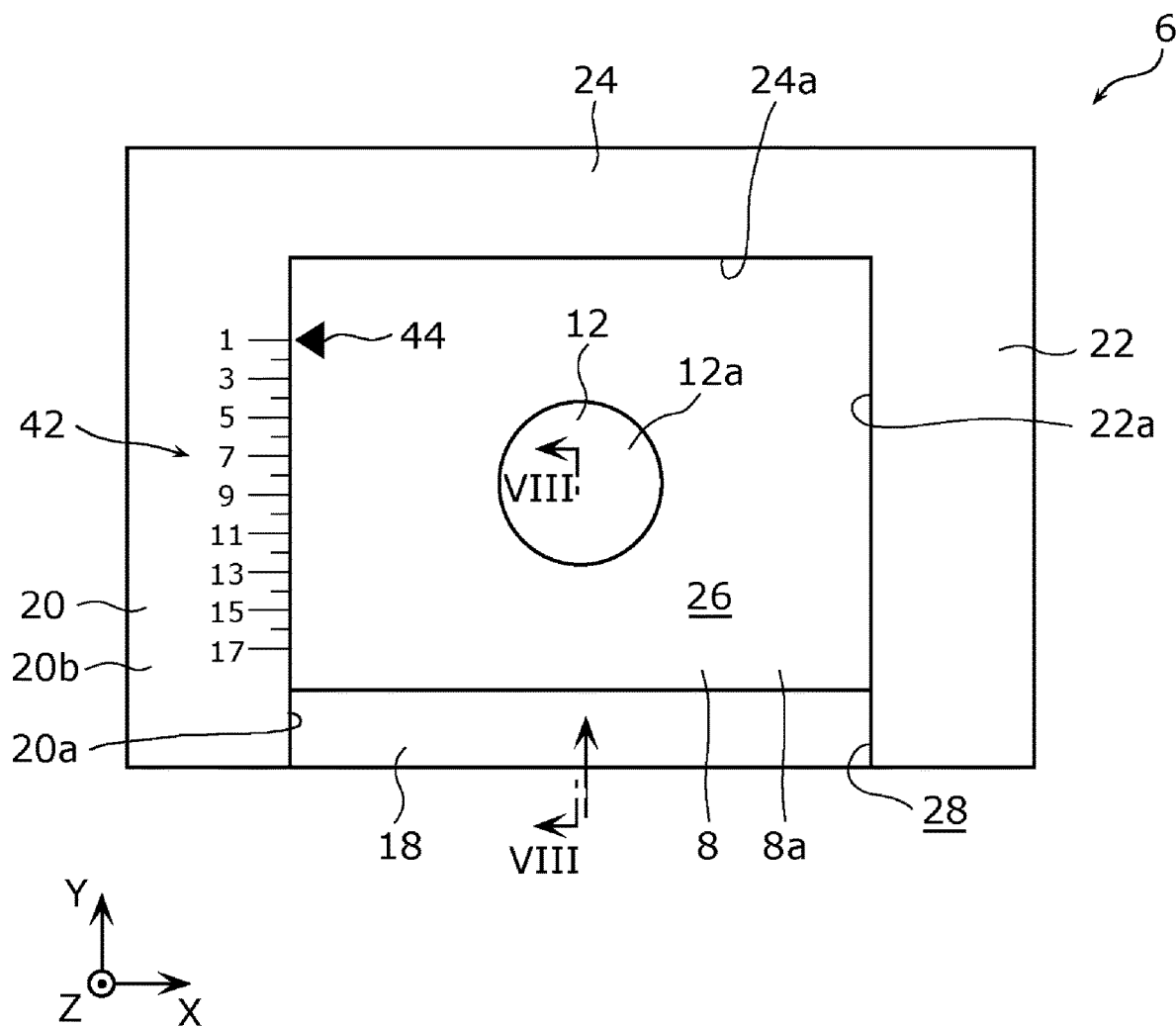
FIG. 7 is a top view showing the base part according to the first embodiment in a state where the object is placed on the upper surface of the support member.
Figure 8:
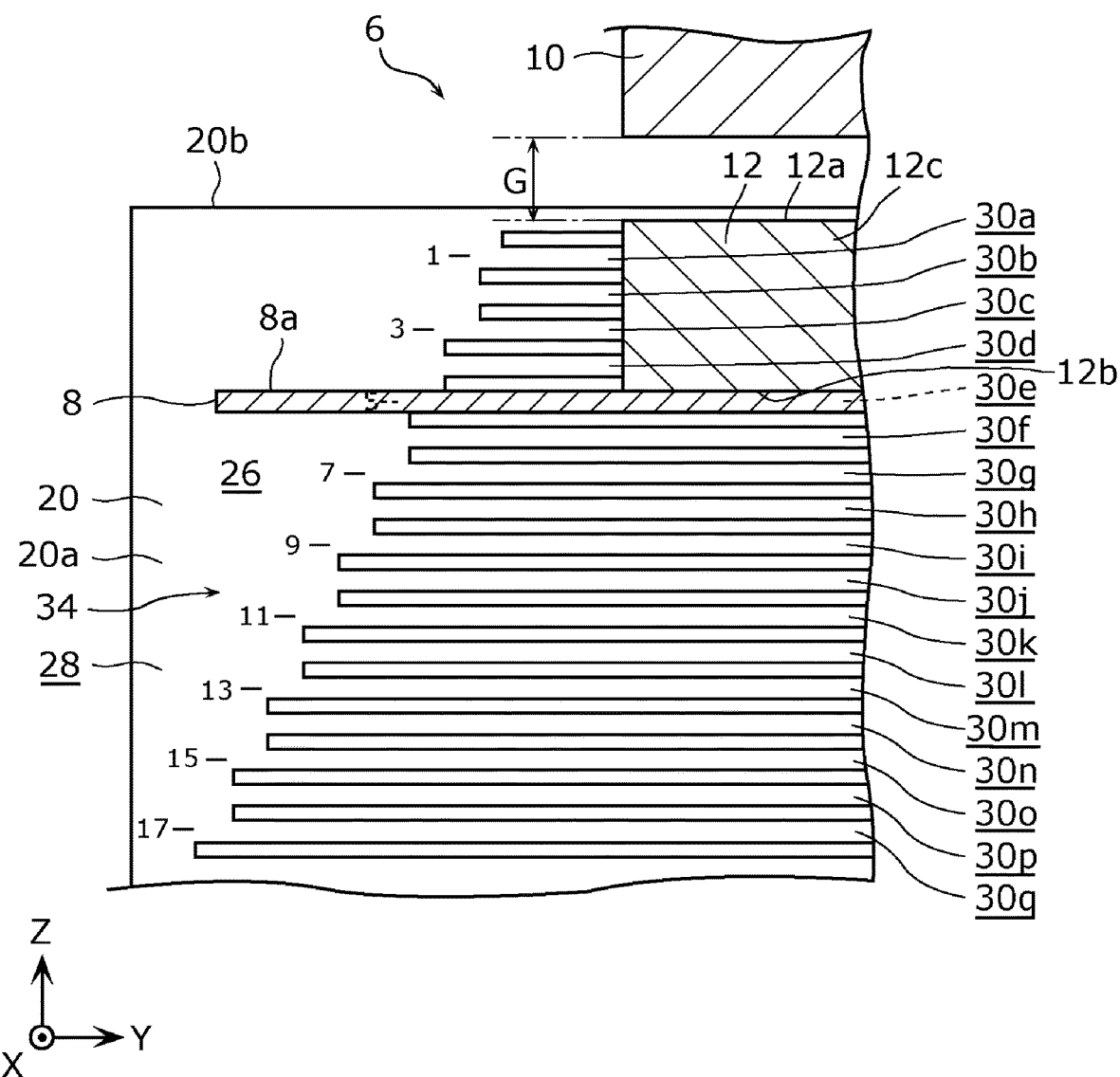
FIG. 8 is a cross-sectional view of a main part taken along the VIII-VIII line of FIG. 7.

Next, a use method of the printing device 2 will be described with reference to FIGS. 6 to 8. FIG. 6 is a top view showing the base part 6 according to the first embodiment in a state where the object 12 is sandwiched between the support member 8 and the third wall 24. FIG. 7 is a top view showing the base part 6 according to the first embodiment in a state where the object 12 is placed on the upper surface 8a of the support member 8. FIG. 8 is a cross-sectional view of a main part taken along the VIII-VIII line of FIG. 7.

In the following description, it is assumed that the object 12 to be printed has, for example, a cylindrical shape having an upper surface 12a, a lower surface 12b, and a side surface 12c, and printing is performed on the upper surface 12a, which is the printed surface.

First, the user pulls out the base part 6 to the outside of the housing 4 toward the front side through the opening 14 of the housing 4. Next, the user engages the support member 8 with any first slit (for example, the first slit 30k) among the plurality of first slits 30a to 30q, and the user engages the support member 8 with a second slit (for example, the second slit 36k) facing the corresponding any first slit among the plurality of second slits 36a to 36q.

After that, as shown in FIG. 6, the user disposes the object 12 in the space 26 so that the upper surface 12a (or the lower surface 12b) of the object 12 to be printed faces the third side surface 24a of the third wall 24. From this state, by sliding the support member 8 from the pull-out position to the storage position, the user sandwiches the object 12 between the support member 8 and the third side surface 24a of the third wall 24 in its thickness D direction. At this time, the user checks which of the 17 scale lines of the third scale 42 is pointed to by the mark 44 provided on the upper surface 8a of the support member 8. In the example shown in FIG. 6, the mark 44 points to the scale line assigned the number "5" of the third scale 42, which corresponds to the thickness D of the object 12.

After that, the user takes out the object 12 from the space 26 of the base part 6 and slides the support member 8 toward the pull-out position to remove it from the base part 6. The user engages the support member 8 removed from the base part 6 with the first slit 30e assigned the number "5" of the first scale 34, which is the same as the number "5" of the third scale 42 pointed to by the mark 44, among the plurality of first slits 30a to 30q, and engages the support member 8 with the second slit 36e assigned the number "5" of the second scale 40, which is the same as the number "5" of the third scale 42 pointed to by the mark 44, among the plurality of second slits 36a to 36q. From this state, the user slides the support member 8 from the pull-out position to the storage position.

After that, as shown in FIG. 7, the user places the object 12 on the upper surface 8a of the support member 8 so that the upper surface 12a of the object 12 faces upward, and disposes the base part 6 inside the housing 4 through the opening 14. As a result, as shown in FIG. 8, a distance G (hereinafter referred to as the "print gap") from the upper surface 12a of the object 12 to the head part 10 may be adjusted to an optimal distance (for example, 1 mm to 2 mm).

Further, in the embodiment, the object 12 is sandwiched between the support member 8 and the third side surface 24a of the third wall 24, but this step may be omitted. In this case, for example, the user starts a predetermined application installed in a terminal device such as a smartphone and inputs information about the object 12 to be printed. As a result, the terminal device displays a number (for example, "3") indicating which first slit among the plurality of first slits 30a to 30q should be engaged with the support member 8. The user is able to adjust the print gap to the optimal distance by engaging the support member 8 with the first slit and the second slit (for example, the first slit 30c and the second slit 36c) assigned the number of the first scale 34 and the number of the second scale 40 which are the same as the displayed numbers.

[1-4. Effect]

As described above, in the embodiment, the print gap may be adjusted by engaging the support member 8 with any first slit among the plurality of first slits 30a to 30q and with a second slit facing the corresponding any first slit among the plurality of second slits 36a to 36q. As a result, even when printing is performed on the object 12 having various thicknesses D, the height position of the upper surface 12a of the object 12 in the up-down direction may be accurately adjusted with a simple configuration.

Second Embodiment

[2-1. Configuration of Base Part]

Figure 9:
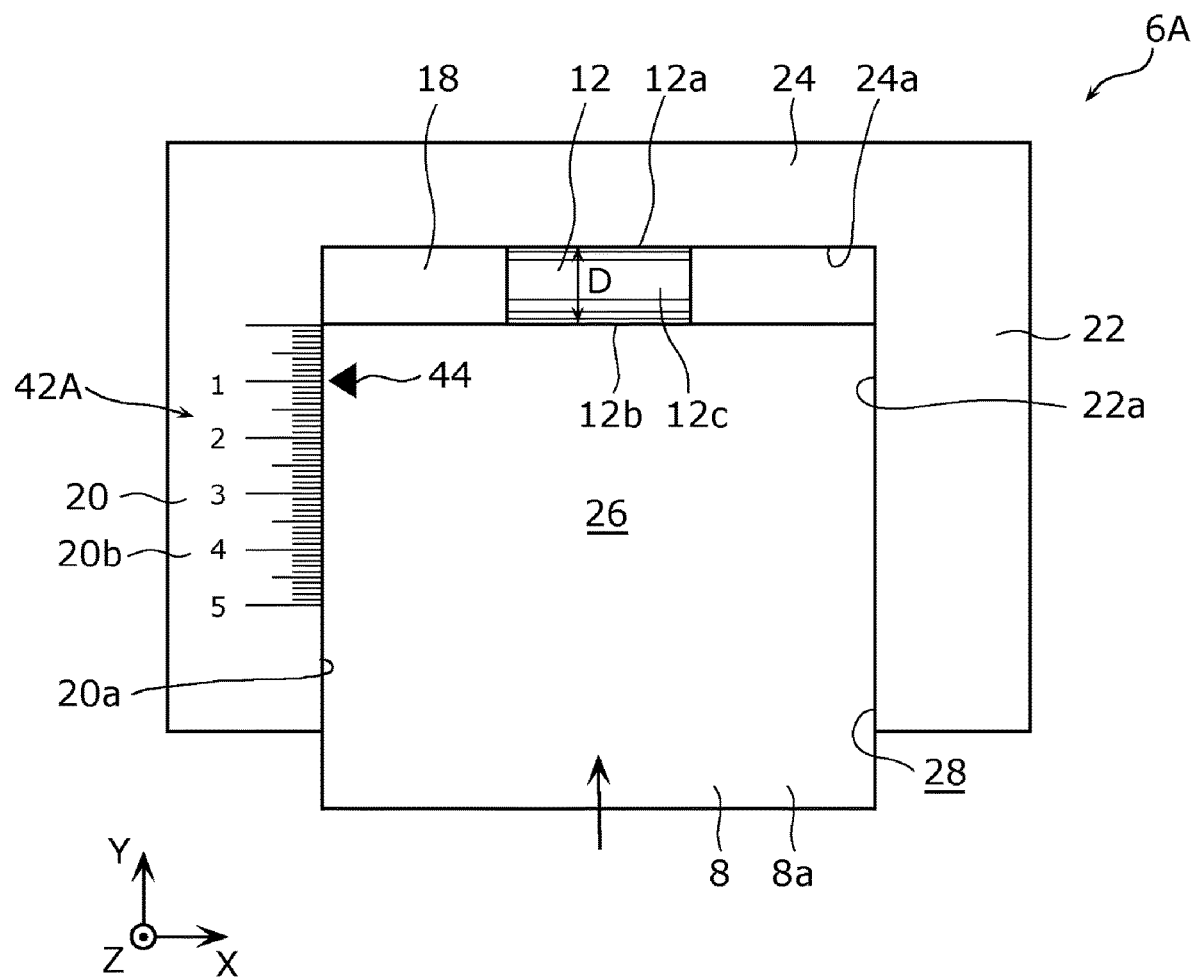
FIG. 9 is a top view showing the base part according to the second embodiment in a state where the object is sandwiched between the support member and the third wall.
Figure 10:
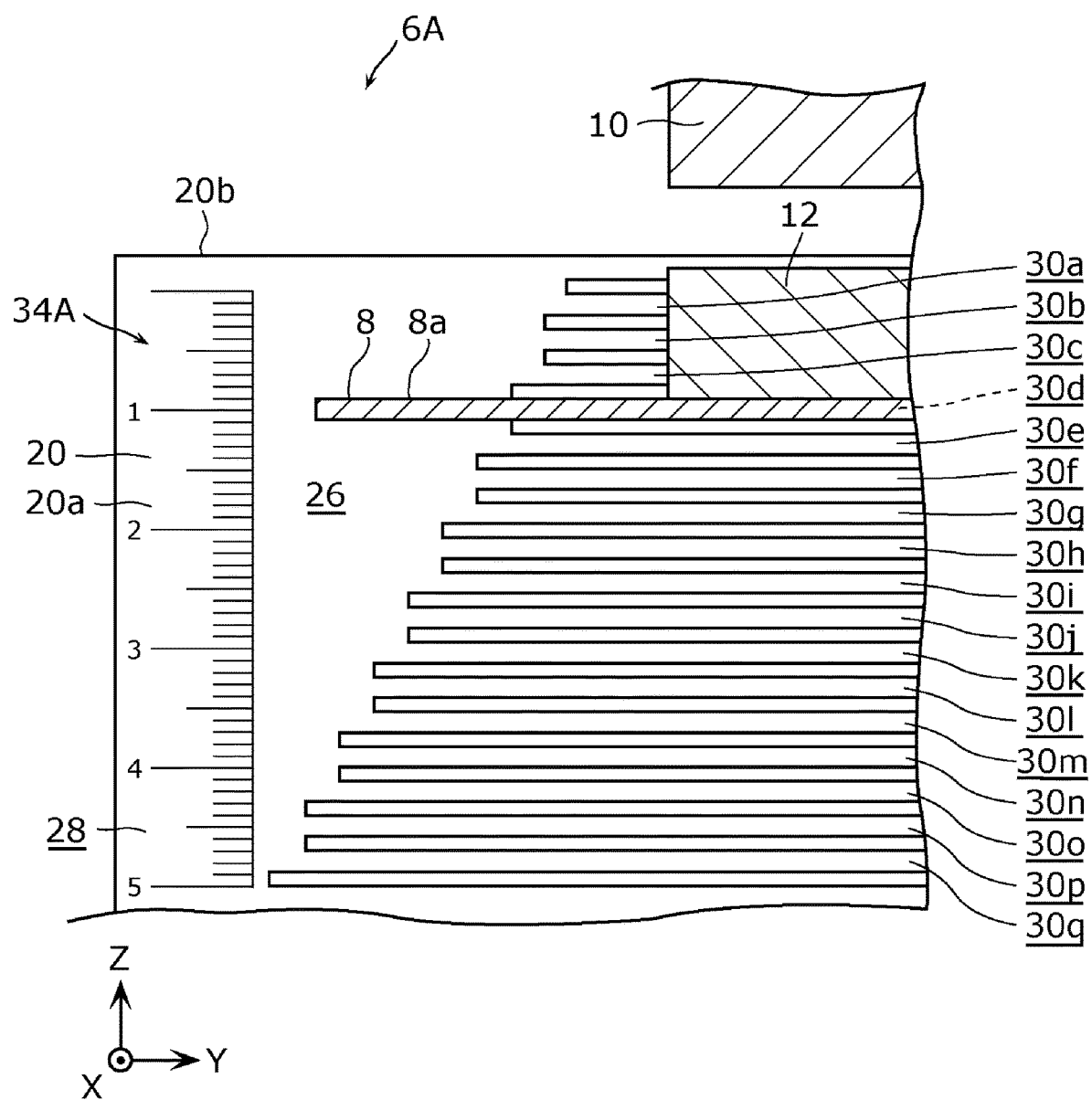
FIG. 10 is a side view showing the first wall of the base part according to the second embodiment in a state where the object is placed on the upper surface of the support member.

The configuration of a base part 6A according to the second embodiment will be described with reference to FIGS. 9 and 10. FIG. 9 is a top view showing the base part 6A according to the second embodiment in a state where the object 12 is sandwiched between the support member 8 and the third wall 24. FIG. 10 is a side view showing the first wall 20 of the base part 6A according to the second embodiment in a state where the object 12 is placed on the upper surface 8a of the support member 8. Further, in each of the following embodiments, the same components as those of the first embodiment are designated by the same reference numerals, and the description thereof will be omitted.

As shown in FIG. 9, in the base part 6A according to the second embodiment, the configuration of the third scale 42A is different from that of the first embodiment. Specifically, on the third scale 42A, a plurality of scale lines are displayed along the front-rear direction in 1 mm increments with a dimensional scale in the range of 0 mm to 50 mm. The third scale 42A is a dimensional scale for measuring the thickness D of the object 12 sandwiched between the support member 8 and the third side surface 24a of the third wall 24. Further, in the state where the support member 8 is at the storage position (that is, the state where the object 12 is not sandwiched between the support member 8 and the third side surface 24a of the third wall 24), the mark 44 provided on the upper surface 8a of the support member 8 points to the scale line of the dimension "0 mm" of the third scale 42A.

Further, as shown in FIG. 10, in the base part 6A according to the second embodiment, the configuration of the first scale 34A is different from that of the first embodiment.

Specifically, on the first scale 34A, similarly to the third scale 42A, a plurality of scale lines are displayed along the up-down direction in 1 mm increments with a dimensional scale in the range of 0 mm to 50 mm.

Further, although not shown, in the base part 6A according to the second embodiment, the configuration of the second scale is different from that of the first embodiment. Specifically, on the second scale, similarly to the third scale 42A, a plurality of scale lines are displayed along the up-down direction in 1 mm increments with a dimensional scale in the range of 0 mm to 50 mm.

[2-2. Use Method of Printing Device]

Next, a use method of the printing device according to the second embodiment will be described with reference to FIGS. 9 and 10.

As in the first embodiment, by sliding the support member 8 from the pull-out position to the storage position, the user sandwiches the object 12 between the support member 8 and the third side surface 24a of the third wall 24 in its thickness D direction. At this time, in this embodiment, the user checks which scale line of the dimension of "0 mm" to "50 mm" of the third scale 42A is pointed to by the mark 44 provided on the upper surface 8a of the support member 8. In the example shown in FIG. 9, the mark 44 points to the scale line of the dimension "10 mm (1 cm)" of the third scale 42A. This indicates that the thickness D of the object 12 is 10 mm.

After that, as in the first embodiment, the user takes out the object 12 from the space 26 of the base part 6A and slides the support member 8 toward the pull-out position to remove it from the base part 6A. Next, in this embodiment, the user engages the support member 8 removed from the base part 6A with the first slit 30d corresponding to the dimension "10 mm" of the first scale 34A same as the dimension "10 mm" of the third scale 42A among the plurality of first slits 30a to 30q, engages the support member 8 with the second slit 36d (with reference to FIG. 5) corresponding to the dimension "10 mm" of the second scale same as the dimension "10 mm" of the third scale 42A among the plurality of second slits 36a to 36q, and slides the support member 8 from the pull-out position to the storage position.

[2-3. Effect]

The same effect as that of the first embodiment may also be obtained in this embodiment.

Third Embodiment

[3-1. Configuration of Base Part]

Figure 11:
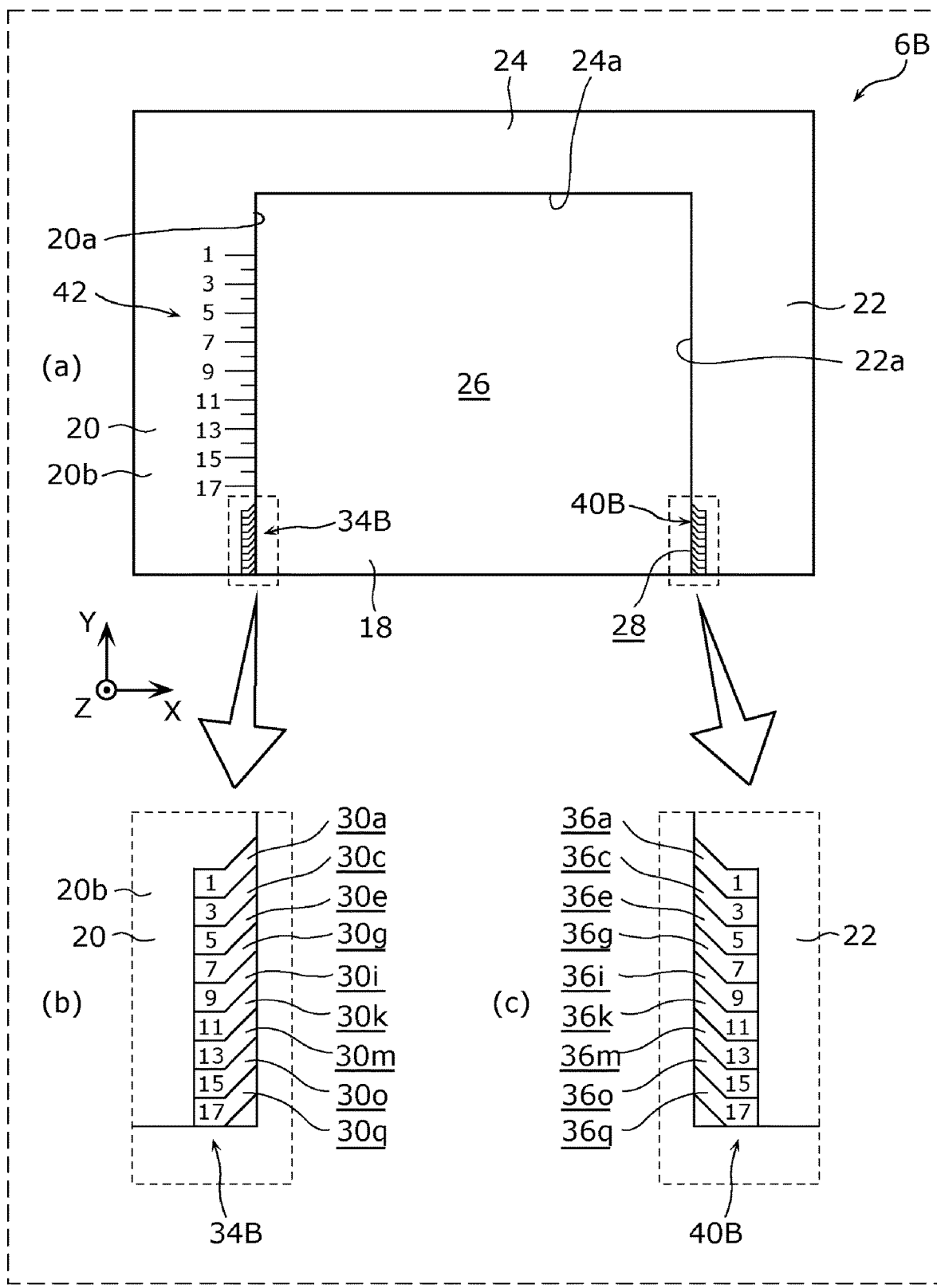
FIG. 11 is a top view showing the base part according to the third embodiment.
Figure 12:
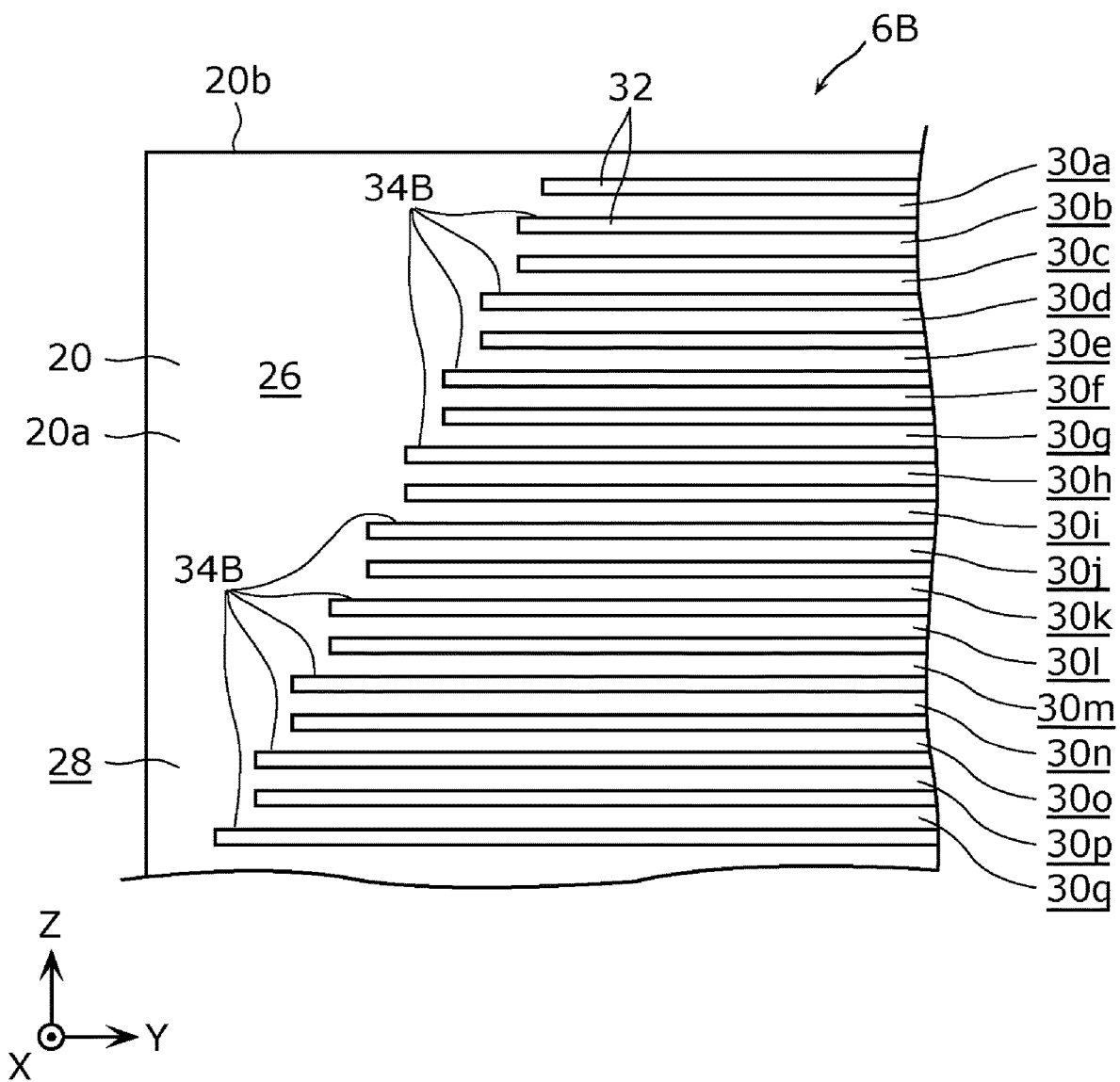
FIG. 12 is a side view showing the first wall of the base part according to the third embodiment.

The configuration of a base part 6B according to the third embodiment will be described with reference to FIGS. 11 and 12. FIG. 11 is a top view showing the base part 6B according to the third embodiment. FIG. 12 is a side view showing the first wall 20 of the base part 6B according to the third embodiment.

As shown in (a) and (b) of FIG. 11 and FIG. 12, in the base part 6B according to the third embodiment, the configuration of the first scale 34B is different from that of the first embodiment. Specifically, the first scale 34B is provided at the ends of each of the plurality of first slits 30a to 30q on the side of the opening 28.

For example, for the pair of ridges 32 forming the first slit 30a, the number "1" of the first scale 34B is provided on the upper surface of the lower ridge 32 protruding further to the side of the opening 28 than the upper ridge 32. Similarly, for the pair of ridges 32 forming each of the first slits 30c, 30e, 30g, 30i, 30k, 30m, 30o and 30q, the numbers "3," "5," "7," "9," "11," "13," "15" and "17" of the first scale 34B are respectively provided on the upper surfaces of the lower ridges 32 protruding further to the side of the opening 28 than the upper ridges 32. As a result, as shown in (b) of FIG. 11, each number of the first scale 34B is visible when the base part 6B is viewed from above.

Further, as shown in (a) and (b) of FIG. 11, in the base part 6B according to the third embodiment, the configuration of the second scale 40B is different from that of the first embodiment. Specifically, similarly to the first scale 34B, the second scale 40B is provided at the ends of each of the plurality of second slits 36a to 36q on the side of the opening 28.

For example, for the pair of ridges 38 (with reference to FIG. 5) forming the second slit 36a, the number "1" of the second scale 40B is provided on the upper surface of the lower ridge 38 protruding further to the side of the opening 28 than the upper ridge 38. Similarly, for the pair of ridges 38 forming each of the second slits 36c, 36e, 36g, 36i, 36k, 36m, 36o and 36q, the numbers "3," "5," "7," "9," "11," "13," "15" and "17" of the second scale 40B are respectively provided on the upper surfaces of the lower ridges 38 protruding further to the side of the opening 28 than the upper ridges 38. As a result, as shown in (c) of FIG. 11, each number of the second scale 40B is visible when the base part 6B is viewed from above.

[3-2. Effect]

The same effect as that of the first embodiment may also be obtained in this embodiment.

Modified Example

Although the printing devices according to the first to third embodiments of the disclosure have been described above, the disclosure is not limited to each of the above embodiments. For example, each of the above embodiments may be combined.

In each of the above embodiments, it is configured that numbers are displayed on the first scale 34 (34A) and the third scale 42 (42A), but the disclosure is not limited thereto, and for example, it may be configured that characters, symbols, figures, colors or the like are displayed.

In each of the above embodiments, a plurality of engaging parts are configured by the plurality of first slits 30a to 30q and second slits 36a to 36q, but instead of such slits, for example, they may be configured by a plurality of protrusions disposed at intervals in the front-rear direction.

In each of the above embodiments, the case where the object 12 is food has been described, but the disclosure is not limited thereto, and for example, the object 12 may be a part to be assembled in an assembly model called a plastic model (registered trademark). In this case, the support member forms a runner (a frame body) that supports a plurality of parts that are objects.

INDUSTRIAL APPLICABILITY

The printing device according to the disclosure may be applied as a food printer for printing on food such as cookies or bread.

What is claimed is:

1. A printing device for printing on an object, the printing device comprising:
    a base part which has an opening on a side and has a plurality of engaging parts disposed side by side in an up-down direction;
    a support member for supporting the object, wherein the support member is slidably engaged with any engaging part among the plurality of engaging parts in a lateral direction from the side of the opening and is slidable through the opening between a pull-out position pulled out from the base part and a storage position stored in the base part; and
    a head part which is disposed above the support member located at the storage position and ejects ink toward the object supported by the support member,
    wherein the base part comprises:
        a first wall which has a first side surface; and
        a second wall which has a second side surface disposed facing the first side surface,
    wherein a space for communicating with the opening and for disposing the support member at the storage position is formed between the first wall and the second wall, and
    wherein the plurality of engaging parts comprise:
        a plurality of first slits formed on the first side surface of the first wall, each of the plurality of first slits extending in the lateral direction and being disposed side by side in the up-down direction; and
        a plurality of second slits formed on the second side surface of the second wall, each of the plurality of second slits extending in the lateral direction and being disposed facing each of the plurality of first slits.

2. The printing device according to claim 1, wherein a first scale indicating positions of each of the plurality of first slits is provided on the first wall, and
    a second scale indicating positions of each of the plurality of second slits is provided on the second wall.

3. The printing device according to claim 2, wherein the first scale is provided on the first side surface of the first wall, and
    the second scale is provided on the second side surface of the second wall.

4. The printing device according to claim 2, wherein ends of each of the plurality of first slits on the side of the opening are disposed in a stepwise manner along the up-down direction, and
    the first scale is provided at the ends of each of the plurality of first slits,
    wherein ends of each of the plurality of second slits on the side of the opening are disposed in a stepwise manner along the up-down direction, and
    the second scale is provided at the ends of each of the plurality of second slits.

5. The printing device according to claim 2, wherein the base part further comprises a third wall which has a third side surface disposed on an opposite side of the opening with respect to the space,
    the support member, by sliding from the pull-out position toward the storage position, is able to sandwich the object with the third side surface of the third wall in a thickness direction of the object,
    a third scale corresponding to the first scale is provided on an upper surface of the first wall, and
    a mark for pointing to a part of the third scale corresponding to the thickness of the object when the object is sandwiched between the support member and the third side surface of the third wall is provided on an upper surface of the support member.

* * * * *